Aug. 4, 1953 — E. O. LUNDE — 2,647,536

DIRECTIONAL VALVE

Filed March 22, 1949 — 2 Sheets-Sheet 1

Inventor:
Einar O. Lunde
George E. Cook.
Attorney.

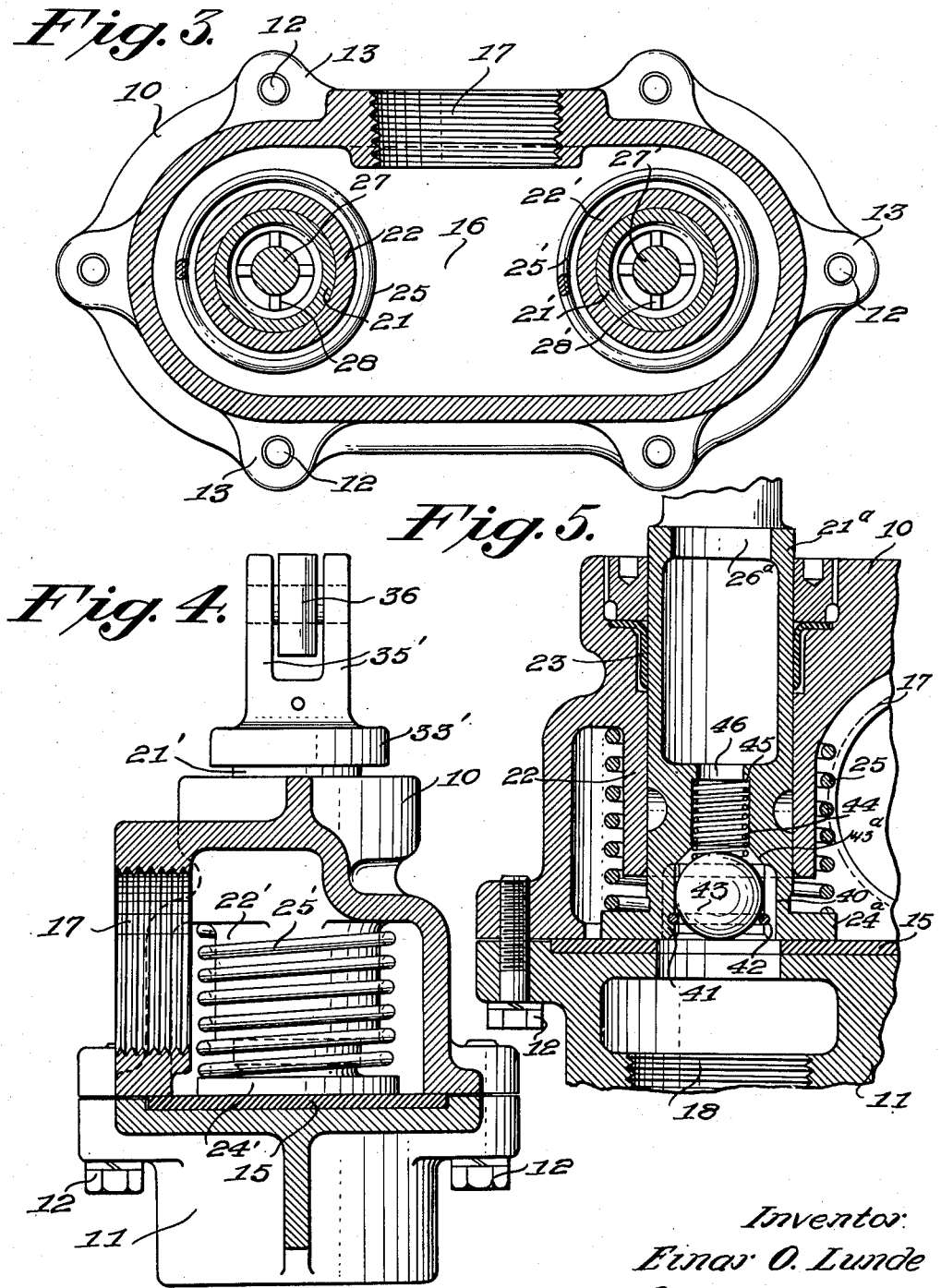

Patented Aug. 4, 1953

2,647,536

UNITED STATES PATENT OFFICE 2,647,536

DIRECTIONAL VALVE

Einar O. Lunde, Wyckoff, N. J., assignor to Magor Car Corporation, New York, N. Y., a corporation of Delaware Application March 22, 1949, Serial No. 82,810

4 Claims. (Cl. 137—622)

This invention relates to a valve.

The invention is more particularly concerned with a directional valve for use in multiple car dumping systems, such as is disclosed in my co-pending application Serial No. 77,655, filed February 21, 1949.

A primary object of the invention is to provide a valve for selectively admitting air under pressure to either one of two operating systems from a single common source of compressed air.

A further and more specific object of the invention is to provide a valve structure comprising a body portion having an air admission chamber therein, and a pair of air outlets communicable with the chamber together with valves controlling the outlets and being selectively and alternately operable for placing either of said outlets in communication with the chamber and the other thereof out of communication with the chamber.

A still further object of the invention is to provide a valve structure having a pair of selectively operable valves for admitting air from a common chamber to one or another of a pair of operating systems, and wherein each valve is provided with a bleeding valve for exhaust of air from either such system when its respective air admission valve is closed.

Other objects and advantages of the invention will become apparent in the course of the following detailed description, taken in connection with the accompanying drawings, wherein:

Fig. 3 is a sectional view in the plane of line 3—3 on Fig. 1.

Fig. 4 is a sectional view in the plane of line 4—4 on Fig. 1 with the operating bar shown in end elevation.

Fig. 5 is a sectional view corresponding to a portion of Fig. 1 and wherein is illustrated a modification of the invention.

Figure 1:
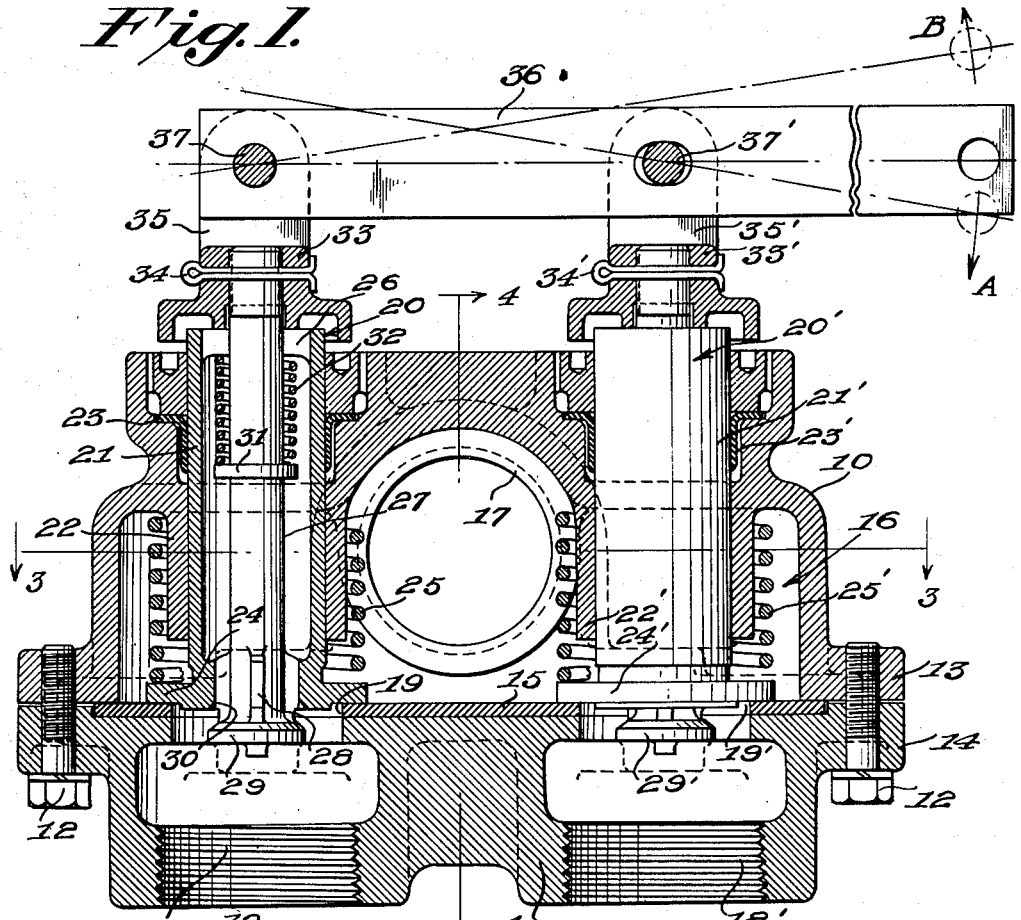
Fig. 1 is a sectional view of the improved valve structure substantially in the plane of the axes of the air control valves, and as in the plane of line 1—1 on Fig. 2.
Figure 2:
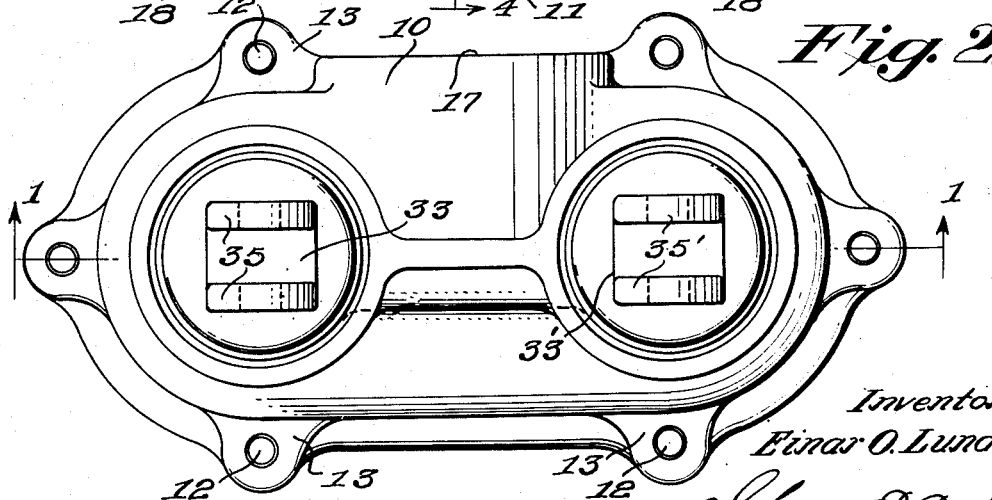
Fig. 2 is a top plan view of the valve structure as illustrated in Fig. 1.

Referring now in detail to the drawings, the improved valve structure comprises a body portion 10 and a cooperating body portion 11, and the body portions have adjacent faces clamped into engagement by means of screw bolts 12 extending through lugs 13 and 14 on the body portions 10 and 11 respectively. The body portion 11 is recessed in its face for receiving a suitable gasket 15.

The body portion 10 is provided with a relatively large air chamber 16 in communication with which is an air inlet connection 17 disposed intermediate the opposite sides of the body portion.

The body portion 11 is provided with a pair of air outlet connections 18 and 18' which are communicable with the chamber 16 through openings 19 and 19' in the gasket 15, and which gasket provides valve seats adjacent the margins of said openings.

The valve structure includes a pair of valves 20 and 20' operable for controlling the admission of air from the chamber 16 into one or the other of the outlet connections 18 or 18'. The valves are of similar construction, and valve 20 will be described in detail, the elements of valve 20' being designated by the same reference numerals as are the elements of valve 20 with a prime designation.

The valve 20 includes a tubular valve stem 21 reciprocably guided in the body portion 10 by means of a skirt 22, and an air sealing gasket 23 is supported by the body portion intermediate the ends of the valve stem. The valve stem at its inner or lower end is provided with a sealing portion 24 which is yieldably urged into seating engagement with gasket 15 by means of a relatively heavy coil spring 25 encircling the skirt 22 and bearing on said sealing portion.

The upper end of the valve stem 21 is provided with circumferentially spaced lugs 26 whose inner ends provide a bearing for the upper end of a bleeding valve stem 27, which adjacent its lower end is provided with guide lugs 28 slidable in a circular passage in the stem 21, and the stem 27 at its lower end is provided with an air sealing portion 29 engageable with a seat 30 on the lower end of stem 21.

The stem 27 is provided with a collar 31 intermediate its ends and a relatively light coil spring 32 encircles the stem with its opposite ends bearings on lugs 26 and collar 31, the spring acting to yieldably urge the bleeding valve to open position, as indicated in Fig. 1.

A head member 33 is releasably secured to the upper end of stem 27 as by means of a cotter 34, and such head member is provided with spaced apertured ears 35 between which is pivotally connected one end of a valve operating bar 36, as by means of a pivot pin 37 extending through the bar and the apertures in the ears. The pin receiving aperture in the bar for receiving the pin 37' cooperating with valve 20' is elongated as is indicated in Fig. 1.

The directional valve above described is particularly adapted for use in admitting air to the cylinders on one or the other side of dump cars and for this purpose the inlet connection 17 is placed in communication with the air reservoir on the cars in the manner disclosed in my above noted co-pending application.

The bar 36 is operated by linkage accessible at an end of the car as in said application and when said bar is moved as indicated by arrow A in Fig. 1, the bleeding valve stem 27 is raised until the bleeding valve is seated, whereupon the air admission valve member 24 is raised from its seat to admit air to the outlet connection 18 and the operating cylinders in communication therewith. Upon movement of bar 36 in the direction of arrow B, the valve 20' will be operated similarly to the valve just described, and since the bar is pivotally connected with each of the valves either thereof will be closed prior to the opening of the other upon movement of the bar in one direction.

It is to be particularly noted that the bleeding valve stems are disposed within and coaxially of the tubular valve stems 21, 21' and that when the air admission valves are closed, the bleeding valves are open, whereby air is exhausted through the tubular valve stems 21, 21', through the spaces between lugs 26, and thence to the atmosphere.

A modified form of bleeding valve is disclosed in Fig. 5 in which the bleeding valve stem is omitted, and the lower end of valve stem 21a is provided with a recess 40 having a cylindrical wall in which are disposed circumferentially spaced channels providing vertical ridges 41 in which is supported a wire ring 42 for confining a ball valve member 43 in the recess 40, and the ridges 41 engage the ball and restrain it against lateral movement.

A relatively light coil spring 44 is disposed in a recess 45 in the stem 21a above the recess 40, and the spring bears at one end thereof on the ball and at its other end it bears on a shoulder at the upper end of recess 45 and between same and a smaller recess 46 which communicates with the upper tubular portion of the valve stem 21a which is open to atmosphere through an opening 26a at the upper end of the valve stem.

The spring 44 holds the ball 43 away from its seat 43a when the valve member 24a is closed as indicated in Fig. 5 and upon raising the stem 21a by the bar 36, the air pressure in chamber 16 will urge the ball to closed or seated position.

While I have disclosed my invention in accordance with certain specific structural embodiments thereof, such are to be considered as illustrative only, and not restrictive, the scope of the invention being defined in the sub-joined claims.

What I claim and desire to secure by U. S. Letters Patent is:

1. A valve structure comprising a body having an air chamber therein, an inlet air connection in said body in communication with said chamber, a pair of outlet connections in said body, and a valve controlling communication between said chamber and each of said outlet connections, said valves each comprising a substantially tubular stem reciprocally supported in the body, a valve member carried by the stem and cooperating with a valve seat about the margin of the respective outlet connection, a spring surrounding the stem and bearing on the valve member for normally holding same closed, means connected with the stems for opening the valves, a bleeding valve disposed within each said stem, and including a valve member engageable with a seat on the valve stem, and a spring normally urging the bleeding valve to open position for exhaust of air through the tubular valve stem when the respective valve member is engaged with its seat.

2. The structure according to claim 1 wherein said bleeding valve comprises a stem disposed within and axially of said tubular valve stem, said second named valve member being carried by one end of the stem, and said valve opening means being directly connected with the stems of the bleeding valves.

3. The structure according to claim 1 wherein said bleeding valve comprises a ball disposed in a recess in the lower end of each of said valve stems, and which recess opens into a respective outlet connection, means limiting movement of the ball in the recess toward the outlet connection, a spring normally urging said ball into engagement with said limiting means, a valve seat in the valve stem engageable by the ball under air pressure upon opening of the respective first named valve, and said recess being in communication with the atmosphere through said valve stem.

4. A directional valve structure comprising an elongated body including upper and lower body portions having engaging faces in a horizontal plane removably secured together, an air chamber in said upper body portion, a horizontal air inlet connection in a side wall of the upper body portion intermediate the ends thereof and communicating with said chamber, a gasket supported on the upper face of said lower body portion in said horizontal plane and provided with a pair of vertical valve controlled openings, one at each side of said air inlet connection and said gasket providing valve seats on its upper face circumferentially of said openings, a pair of vertical air outlet connections in axial alignment with said openings, a pair of valves supported by said upper body portion and including vertically disposed tubular stems having open upper ends, spring means surrounding said stems and normally urging the valves downwardly into engagement with said seats, a normally open bleeding valve associated with each of said hollow stems for escape of air in the respective outlet connection through the open upper end of the hollow stem when the valve carried thereby is closed, said bleeding valves including valve members cooperating with seats on the lower ends of said hollow stems, cylindrical valve stems extending vertically within said hollow stems, spring means surrounding said valve stems and reacting between shoulders on said hollow stems and said cylindrical stems respectively for normally urging said valve members downwardly from engagement with their seats, head members secured to the upper ends of said cylindrical stems in vertically spaced relation to the upper ends of said hollow stems, and a single operating member having pivotal connections with said head members for alternately raising said cylindrical valve stems to seat the respective valve members and thereafter to raise the respective first named valves.

EINAR O. LUNDE.

References Cited in the file of this patent

UNITED STATES PATENTS

| Number | Name | Date |
|---|---|---|
| 300,131 | Reichman | June 10, 1884 |
| 527,143 | Copper-Smith | Oct. 9, 1894 |
| 962,257 | Rockwell | June 21, 1910 |
| 1,050,724 | Emory | Jan. 14, 1913 |
| 1,151,329 | Audett | Aug. 24, 1915 |
| 1,994,974 | Wiedman | Mar. 19, 1935 |
| 2,282,490 | Martin | May 12, 1942 |
| 2,324,690 | Gardiner | July 20, 1943 |
| 2,477,237 | Carr | July 26, 1949 |